US012607764B2

(12) United States Patent
Makino et al.

(10) Patent No.: US 12,607,764 B2
(45) Date of Patent: Apr. 21, 2026

(54) METAL DETECTING DEVICE AND METAL DETECTING METHOD

(71) Applicant: SINTOKOGIO, LTD., Nagoya (JP)

(72) Inventors: Yoshiyasu Makino, Nagoya (JP);
Tatsuya Yamada, Nagoya (JP);
Hideaki Kaga, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 177 days.

(21) Appl. No.: 18/452,006

(22) Filed: Aug. 18, 2023

(65) Prior Publication Data

US 2024/0077634 A1 Mar. 7, 2024

(30) Foreign Application Priority Data

Aug. 23, 2022 (JP) ................................. 2022-132570

(51) Int. Cl.
*G01V 3/10* (2006.01)

(52) U.S. Cl.
CPC ...................................... *G01V 3/10* (2013.01)

(58) Field of Classification Search
CPC ... G01V 3/10; G01V 3/08; G01V 3/38; G01N 27/72; G01R 33/0023
See application file for complete search history.

(56) References Cited

U.S. PATENT DOCUMENTS 4,283,679 A * 8/1981 Ito ........................... G01P 13/04
340/672

2007/0052411 A1 * 3/2007 McClure .................. G01V 3/15
324/228
2019/0011591 A1 1/2019 Takahashi et al.
2020/0284938 A1 9/2020 Chaturvedi et al.

FOREIGN PATENT DOCUMENTS

| JP | 2004264266 A | * | 9/2004 |
| JP | 2015034743 A | * | 2/2015 |
| JP | 2015059818 A | * | 3/2015 |
| JP | 6006901 B1 | | 9/2016 |

OTHER PUBLICATIONS

English translation of JP 2015059818 A (Year: 2015).*
English translation of JP-2004264266-A (Year: 2004).*
English translation of JP-2015034743-A (Year: 2015).*
Extended European Search Report for EP Application No. 23192427.5 mailed Jan. 22, 2024.
European Office Action For 23192427.5 mailed Apr. 16, 2025.
Office Action dated Nov. 24, 2025 issued in European patent application No. 23192427.5.

* cited by examiner

*Primary Examiner* — Giovanni Astacio-Oquendo
*Assistant Examiner* — Haidong Zhang
(74) *Attorney, Agent, or Firm* — Harness, Dickey & Pierce, P.L.C.

(57) ABSTRACT

A metal detecting device includes: a transfer section that transfers an inspection target object, along a path that passes between a first magnet and a second magnet; a first magnetic sensor that is arranged so as to be aligned with the first magnet and that outputs a first signal; and a second magnetic sensor that is arranged so as to be aligned with the second magnet and that outputs a second signal, whether or not the inspection target object contains metal being determined on the basis of strength of the first signal and a phase difference between the first signal and the second signal.

13 Claims, 8 Drawing Sheets

Figure 1:
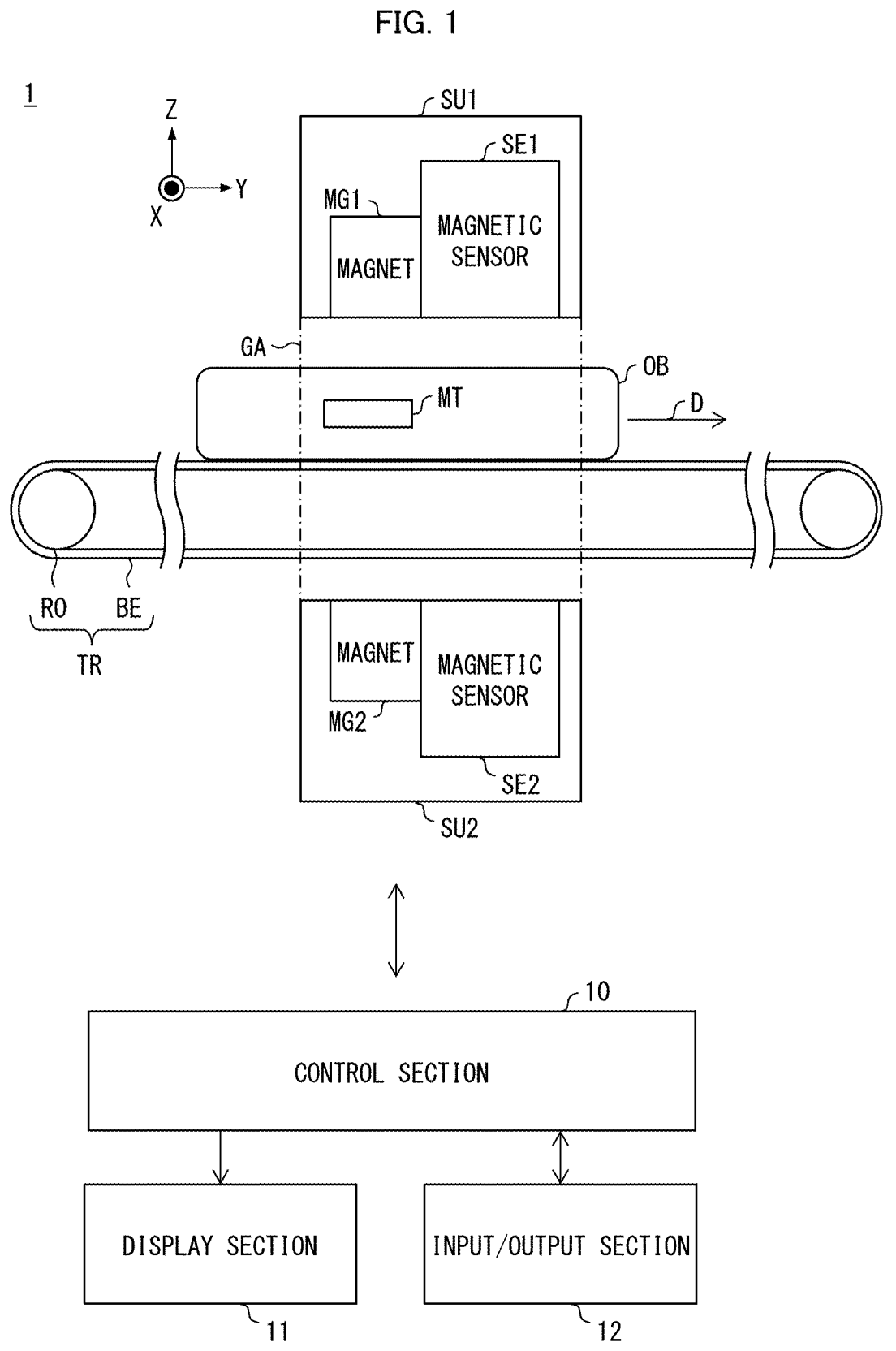

MAGNET

MAGNETIC SENSOR

GA

OB

MT

D →

RO    BE

TR

MAGNET

MAGNETIC SENSOR

MG2

SE2

SU2

10

CONTROL SECTION

DISPLAY SECTION

INPUT/OUTPUT SECTION

Figure 5:
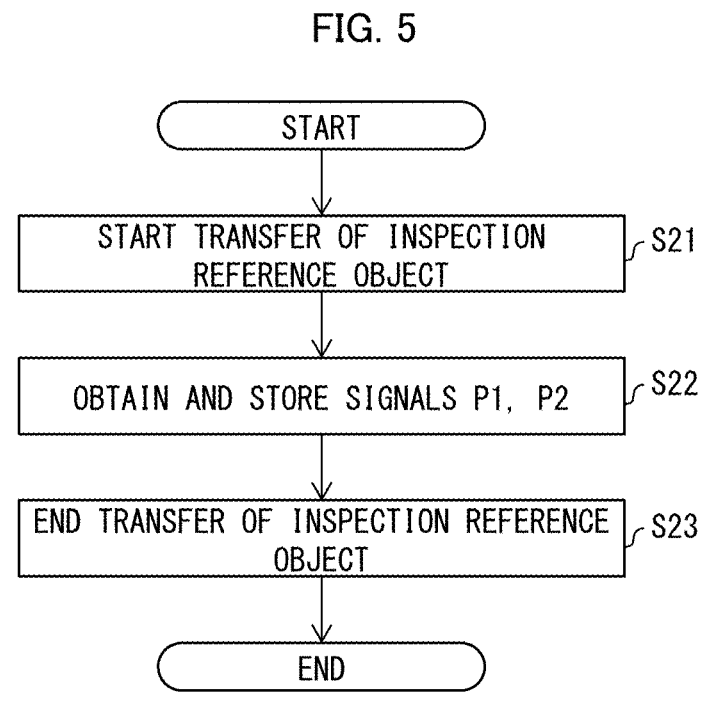

```
                          ╭─────────────╮
                          │    START    │
                          ╰─────────────╯
                                 │
                                 ▼
        ┌──────────────────────────────────────────┐
        │     START  TRANSFER  OF  INSPECTION       │  S21
        │            REFERENCE  OBJECT              │
        └──────────────────────────────────────────┘
                                 │
                                 ▼
        ┌──────────────────────────────────────────┐
        │     OBTAIN  AND  STORE  SIGNALS  P1,  P2  │  S22
        └──────────────────────────────────────────┘
                                 │
                                 ▼
        ┌──────────────────────────────────────────┐
        │  END  TRANSFER  OF  INSPECTION  REFERENCE │  S23
        │                 OBJECT                     │
        └──────────────────────────────────────────┘
                                 │
                                 ▼
                          ╭─────────────╮
                          │     END     │
                          ╰─────────────╯
```

METAL DETECTING DEVICE AND METAL DETECTING METHOD

This Nonprovisional application claims priority under 35 U.S.C. § 119 on Patent Application No. 2022-132570 filed in Japan on Aug. 23, 2022, the entire contents of which are hereby incorporated by reference.

TECHNICAL FIELD

The present invention relates to a metal detecting device and a metal detecting method.

BACKGROUND ART

A technology of a metal detecting device for detecting metal is conventionally known (for example, see Patent Literature 1). In the technology, the metal detecting device may erroneously detects metal due to external noise and/or the like (erroneous detection). The metal detecting device according to Patent Literature 1 prevents an erroneous detection due to an external noise, by (i) exciting in advance a sensor coil with use of a white noise waveform signal and (ii) reducing a detection signal caused by external magnetic noise (see Abstract).

CITATION LIST

Patent Literature

Patent Literature 1

Japanese Patent No. 6006901

SUMMARY OF INVENTION

Technical Problem

However, although the technology of Patent Literature 1 can deal with an erroneous detection caused by external magnetic noise, it is difficult for the technology of Patent Literature 1 to prevent an erroneous detection caused by movement (transfer) of a metal material, such as iron, outside the metal detecting device.

An object of an aspect of the present invention is to provide a metal detecting device and a metal detecting method each of which is intended to reduce an erroneous detection caused by an external metal.

Solution to Problem

In order to solve the above problem, a metal detecting device in accordance with an aspect of the present invention includes a first magnet, a second magnet, a transfer section, a first magnetic sensor, a second magnetic sensor, and one or more processors. The first magnet and the second magnet each generate a static magnetic field. The second magnet is arranged so as to face the first magnet. The transfer section transfers an inspection target object along a path that passes between the first magnet and the second magnet. The first magnetic sensor is arranged so as to be aligned with the first magnet, and outputs a first signal which corresponds to a change in the magnetic field. The second magnetic sensor is arranged so as to be aligned with the second magnet or so as to be aligned with the first magnet via the first magnetic sensor, and outputs a second signal which corresponds to a change in the magnetic field. The one or more processors carry out a determination step. In the determination step, whether or not the inspection target object contains metal is determined on the basis of strength of the first signal and a phase difference between the first signal and the second signal.

A metal detecting method in accordance with another aspect of the present invention includes the steps of: causing an inspection target object to pass between a first magnet and a second magnet; obtaining, from a first magnetic sensor, a first signal which corresponds to a change in magnetic field; obtaining, from a second magnetic sensor, a second signal which corresponds to a change in magnetic field; and determining whether or not the inspection target object contains metal. The first magnet and the second magnet each generate a static magnetic field. The second magnet is arranged so as to face the first magnet. The first magnetic sensor is arranged so as to be aligned with the first magnet. The second magnetic sensor is arranged so as to be aligned with the second magnet or so as to be aligned with the first magnet via the first magnetic sensor. The determining of whether or not the inspection target object contains metal is carried out on the basis of strength of the first signal and a phase difference between the first signal and the second signal.

Advantageous Effects of Invention

According to an aspect of the present invention, it is possible to provide a metal detecting device and a metal detecting method each of which is intended to reduce an erroneous detection caused by an external metal.

BRIEF DESCRIPTION OF DRAWINGS

FIG. 1 is a view illustrating a metal detecting device in accordance with Embodiment 1 of the present invention.

FIG. 5 is a flowchart showing a process for obtaining a reference signal.

DESCRIPTION OF EMBODIMENTS

Figure 6:
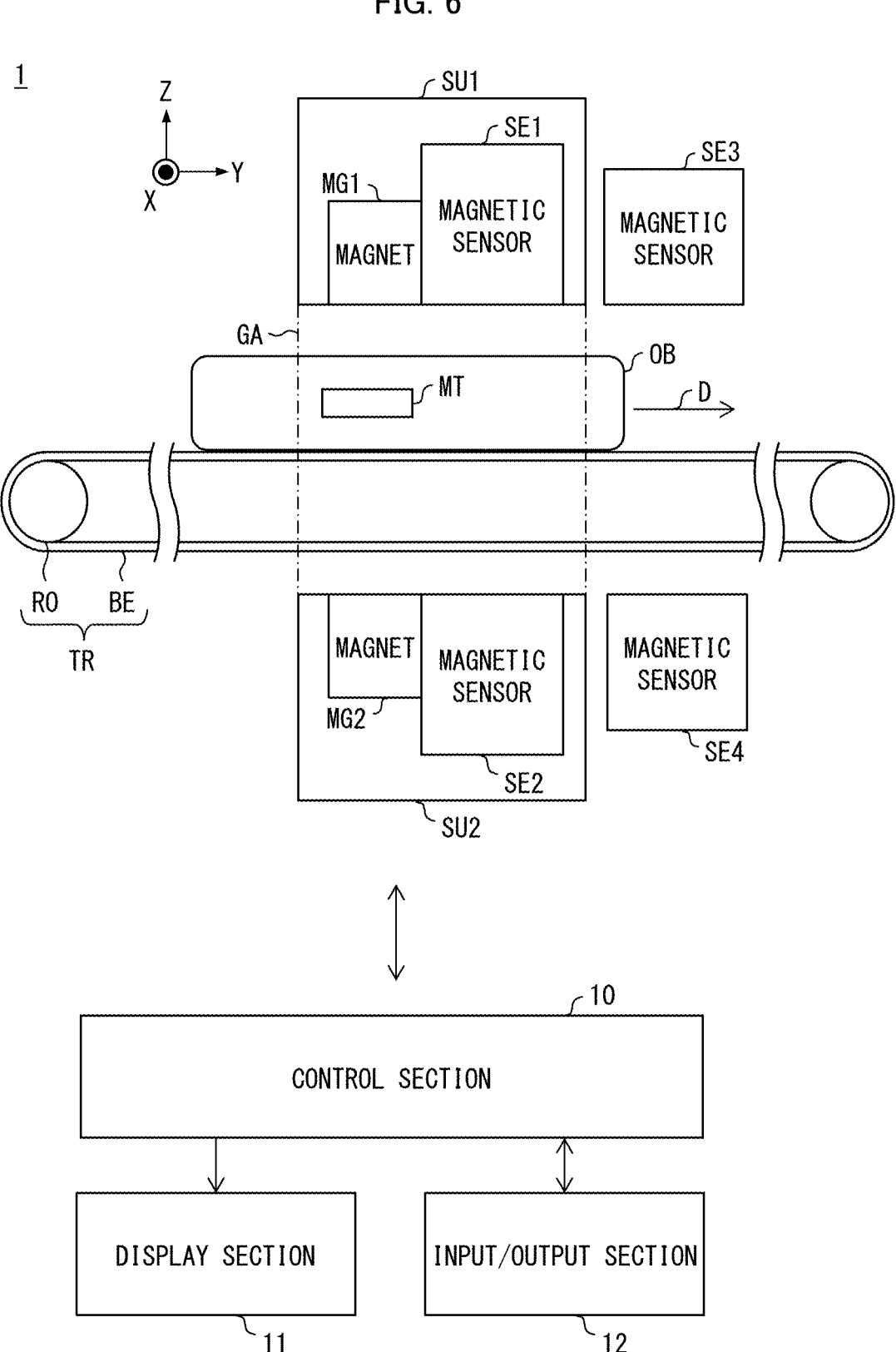
FIG. 6 is a view illustrating a metal detecting device in accordance with Embodiment 2 of the present invention.

The following description will discuss embodiments of the present invention in detail. In FIGS. 1 and 6, an up and down direction is defined as a z-axis direction, a left and right direction is defined as a y-axis direction, and a front and back (front and rear) direction is defined as an x-axis direction. Here, the z-axis direction (up and down direction in the drawings) corresponds to an up and down direction (vertical direction: gravity direction) at the time when a metal detecting device 1 is installed.

FIG. 1 is a view illustrating the metal detecting device 1 in accordance with Embodiment 1 of the present invention. The metal detecting device 1 includes detection units SU1 and SU2, a transfer section TR, a control section 10, a display section 11, and an input/output section 12, and detects a metal foreign substance MT which is contained in an inspection target object OB.

The metal foreign substance MT to be detected is a magnetic material (for example, iron, cobalt, nickel, and alloys thereof) and does not include a non-magnetic material (for example, copper and aluminum). Since the metal detecting device 1 detects the metal foreign substance MT with use of disturbance of a magnetic field due to the metal foreign substance MT (magnetic material), the metal detecting device 1 does not detect a non-magnetic material that does not affect the magnetic field. In addition, the metal detecting device 1 can detect even non-metal, provided that the non-metal is a magnetic material.

The inspection target object OB is generally an article (for example, food, beverage, and their packaging and containers) which originally does not contain metal. Here, the packaging may be aluminum foil or a film obtained by depositing aluminum. As described above, since aluminum is non-magnetic, aluminum does not inhibit detection of the metal foreign substance MT by the metal detecting device 1.

The transfer section TR transfers the inspection target object OB along a path which passes between the detection units SU1 and SU2 that face each other, that is, between the magnet MG1 (first magnet) and the magnet MG2 (second magnet), which will be described later.

The transfer section TR is, for example, a belt conveyor, and can be composed of a pair of rollers RO and a belt BE wound on the pair of rollers RO. The inspection target object OB is placed on the belt BE and the rollers RO are rotated, so that the inspection target object OB that is placed on the belt BE is transferred in a transfer direction D. Here, the transfer direction D is a y-axis positive direction, but may reversely be a y-axis negative direction. The transfer section TR transfers the inspection target object along the path that passes between the magnet MG1 (first magnet) and the magnet MG2 (second magnet).

The detection units SU1 and SU2 have the magnets MG1 and MG2, respectively, and magnetic sensors SE1 and SE2, respectively. Further, the detection units SU1 and SU2 are arranged so as to face each other, and detect the metal foreign substance MT with use of the disturbance of the magnetic field due to the metal foreign substance MT in the inspection target object OB. In addition, a space which the detection units SU1 and SU2 face is defined as an in-gate space GA.

The magnet MG1 (first magnet) and the magnet MG2 (second magnet) are, for example, stationary magnets (for example, neodymium magnets), which are arranged so as to face each other and each of which generates a magnetic field that is static (for example, a static magnetic field). With use of the stationary magnets, the detection units SU1 and SU2 can be made compact and energy-saving. Note, however, that the magnets MG1 and MG2 may be constituted by electromagnets. That is, during operation of the metal detecting device 1, the static magnetic field may be generated by causing a steady current to pass through each of the electromagnets.

Here, the magnet MG1 has a first pole that is S pole or N pole, and the magnet MG2 has a second pole that faces the first pole of the magnet MG1 and that has the same polarity as the first pole. The inspection target object OB passes between the first pole and the second pole that have the same polarity. That is, the magnets MG1 and MG2 are arranged in such a manner that poles having the same polarity (N or S) face each other, and are also arranged so as to face each other via the path along which the inspection target object OB is transferred. This improves accuracy of detection of the metal foreign substance MT which is contained in the inspection target object OB. This will be described in detail later.

The magnetic sensor SE1 (first magnetic sensor) and the magnetic sensor SE2 (second magnetic sensor) are arranged so as to face each other via the transfer section TR (ultimately, the path for transferring the inspection target object OB). The magnetic sensors SE1 and SE2 are arranged so as to be aligned (for example, in the Y-axis direction) with the magnets MG1 and MG2, respectively, and are constituted by, for example, respective coils. Then, the magnetic sensors SE1 and SE2 output, respectively, voltages V1 and V2 (signal P1: first signal, and signal P2: second signal) which correspond to changes in the magnetic field (see FIG. 2). The reference signs L and R in FIG. 2 denote an inductance component and a resistance component of the coils, respectively. Here, the coils constituting the magnetic sensors SE1 and SE2 are each protected from the surrounding by a cover that is made of, for example, a non-magnetic steel plate (for example, SUS304). In addition, respective center axes of the coils of the magnetic sensor SE1 and the magnetic sensor SE2 can be substantially parallel to a direction (for example, the z-axis direction) in which the magnetic poles of the magnet MG1 and the magnet MG2 are arranged.

The cover is made of a non-magnetic material in order to prevent a decrease in accuracy of detection of the metal foreign substance MT. That is, in a case where the cover is made of a magnetic material (for example, a steel plate for shielding), the magnetic field is not easily attracted to the metal foreign substance MT, and thus the accuracy of detection of the metal foreign substance MT is lowered. The cover is made of a steel plate in order to ensure strength of the cover and also to ensure protection of the magnetic sensor SE1 and the magnetic sensor SE2.

The inspection target object OB passes between the detection units SU1 and SU (ultimately, between the magnets MG1 and MG2). At this time, in a case where the inspection target object OB contains the metal foreign substance MT, the magnetic field generated by the magnets MG1 and MG2 is disturbed by the metal foreign substance MT, and thus the magnetic field received by the magnetic sensors SE1 and SE2 changes. As a result, the metal foreign substance MT is detected.

As described above, the magnets MG1 and MG2 are arranged in a manner that poles having the same polarity (N or S) face each other, and are also arranged so as to face each other via the path along which the inspection target object OB is transferred. In addition, the magnetic sensors SE1 and SE2 are also arranged so as to face each other via the path along which the inspection target object OB is transferred. Thus, the accuracy of detection of the metal foreign substance MT can be improved. This will be described in detail later.

The control section 10 controls transfer of the inspection target object OB by the transfer section TR, and detects the metal foreign substance MT on the basis of signals from the detection units SU1 and SU2.

The display section 11 is, for example, a liquid crystal display or an electroluminescent (EL) display. The display section 11 displays a result of detection of the metal foreign substance MT by the control section 10 (a determination result as to whether or not the inspection target object OB contains metal and a confirmation result as to whether or not the determination result is correct or erroneous). In addition, instead of the display section 11 or in addition to the display section 11, a sound output device (for example, a speaker) which outputs, as a sound, the result of detection may be provided.

The input/output section 12 is connected to the transfer section TR and is used for control, by the control section 10, of a power source (for example, a motor, not shown) of the transfer section TR. The input/output section 12 may output a signal that indicates the result of detection of the metal foreign substance MT.

Figure 2:
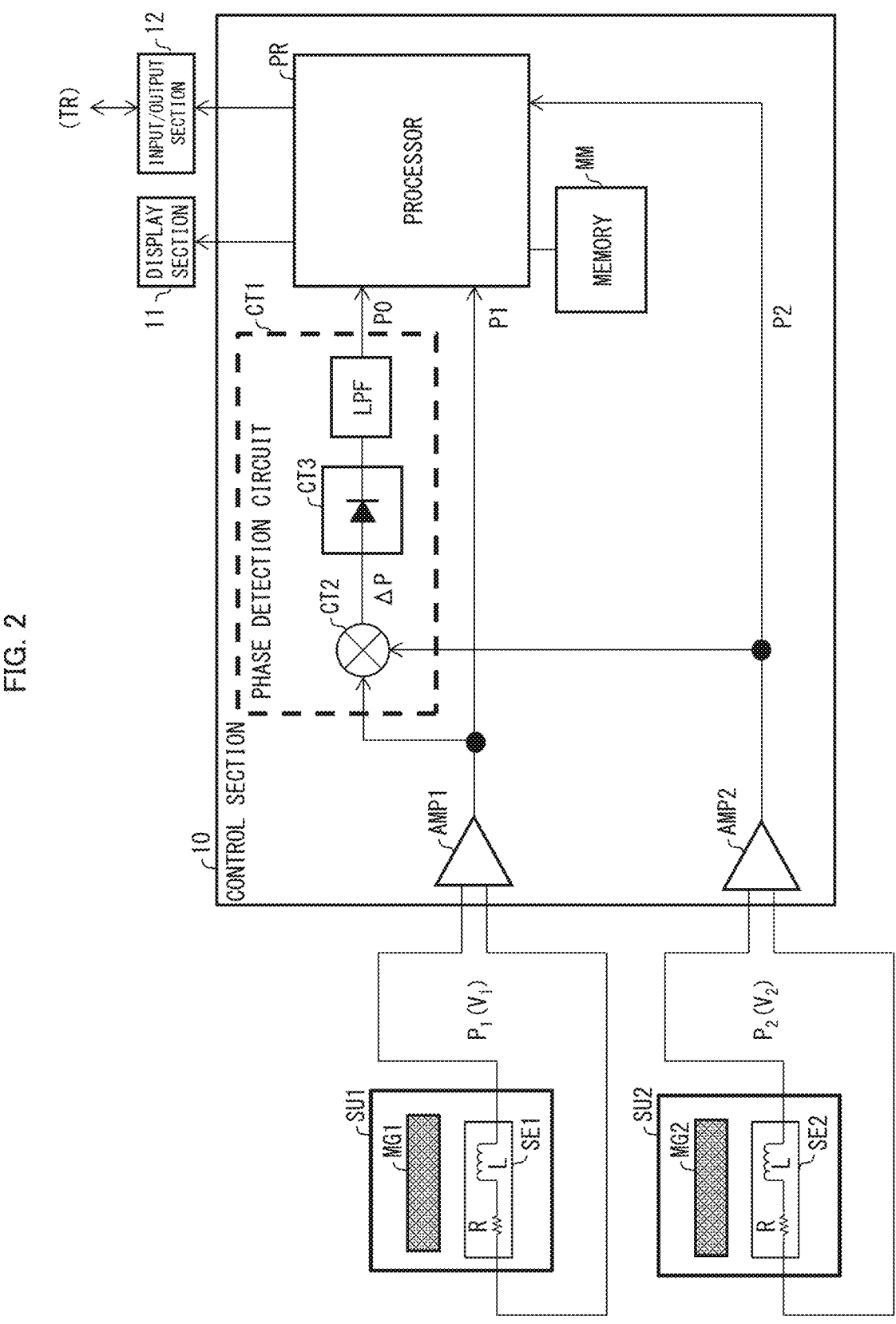
FIG. 2 is a diagram illustrating details of a control section.

FIG. 2 is a view illustrating an internal configuration of the control section 10 and a connection relationship between the detection units SU1 and SU2. The control section 10 includes amplifiers AMP1 and AMP2, a phase detection circuit CT1, a processor PR, and a memory MM. The phase detection circuit CT1 includes a differential circuit CT2, an absolute value circuit CT3, and a low-pass filter LPF. Here, omitted for easy understanding is a signal processing section that carries out A/D conversion of signals P1, P2, and P0 which are to be inputted to the processor PR and that carries out signal processing.

The amplifiers AMP1 and AMP2 amplify signals P1 and P2 (voltages V1 and V2) which are outputted from the magnetic sensors SE1 and SE2, respectively, and then output the signals P1 and P2 to the processor PR.

The phase detection circuit CT1 is a circuit that outputs, to the processor PR, the signal P0 (phase detection signal) corresponding to a phase difference between the signals P1 and P2 thus amplified. Further, the phase detection circuit CT1 functions as a differential detection circuit that outputs a differential detection signal indicative of a differential between the first signal (signal P1) and the second signal (signal P2). The phase detection circuit CT1 includes the differential circuit CT2, the absolute value circuit CT3, and the low-pass filter LPF. The signal P0 is used for determining the phase difference between the signals P1 and P2 (the first signal and the second signal).

The differential circuit CT2 outputs a difference signal ΔP between the signals P1 and P2 amplified. The absolute value circuit CT3 is, for example, a full-wave rectifier that outputs an absolute value of the difference signal ΔP. The low-pass filter LPF removes a harmonic component which is contained in the difference signal rectified.

The signal P0 outputted from the phase detection circuit CT1 is a signal which corresponds to a phase difference θ between the signals P1 and P2. Since the peak value and width of the signal P0 change in accordance with the phase difference θ, the phase difference θ can be determined with use of the peak value or width of the signal P0. Alternatively, the phase difference θ between the signals P1 and P2 can be determined by signal processing of the signals P1 and P2 by a program PG1 instead of the phase detection circuit CT1.

The memory MM stores the program PG1 for causing the processor PR to operate and a determination reference SD for detection of metal. Examples of the determination reference SD include threshold values Th1 and Th2 which correspond to the peak values of the signals P1 and P2, respectively. Alternatively, reference signals SP1 and SP2 that correspond to respective changes in the signals P1 and P2 over time may be used.

The processor PR is, for example, a central processing unit (CPU). The processor PR operates according to the program PG1 and controls transfer of the inspection target object OB by the transfer section TR. Then, the processor PR carries out a determination step of determining whether or not the inspection target object OB contains the metal foreign substance MT on the basis of the signals P1 and P2 (strength of the signal P1 or P2, and the phase difference between the signals P1 and P2) from the detection units SU1 and SU2.

Figure 3:
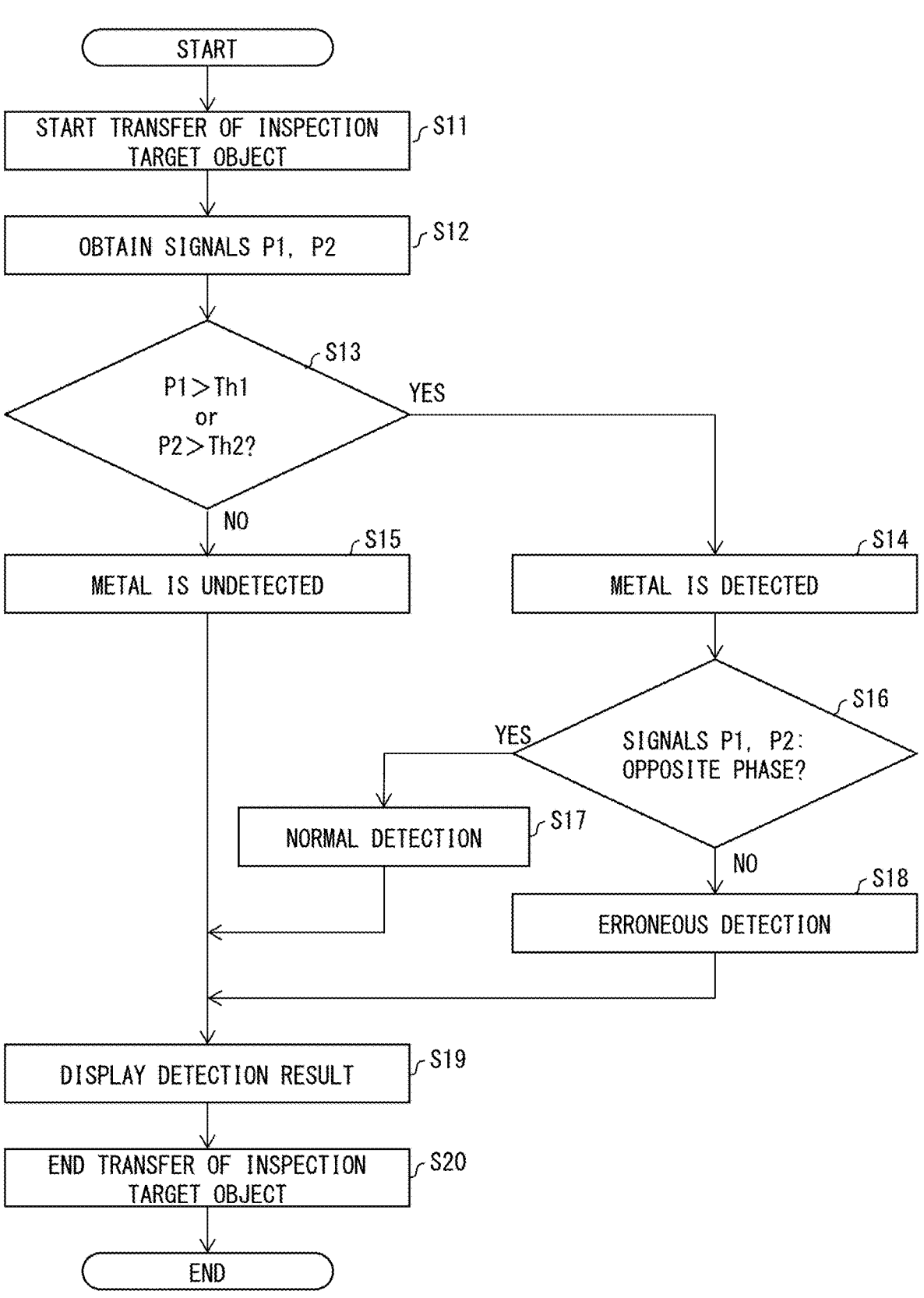
FIG. 3 is a flowchart showing an example of a metal detecting method in accordance with Embodiment 1.

The following description will discuss a process for detecting a metal foreign substance MT by the control section 10 (ultimately, the processor PR). FIG. 3 is a flowchart showing an example of a process for detecting metal (metal foreign substance MT).

(1) Placing and Starting Transfer of Inspection Target Object OB (Step S11)

The inspection target object OB is placed on the belt BE (on a conveyance path) of the transfer section TR and transferred so as to pass between the detection units SU1 and SU2 (Step S11).

Here, the inspection target object OB is placed on the left side of the detection units SU1 and SU2, and the transfer direction D is set to the y-axis positive direction. Note, however, that conversely, the inspection target object OB may be placed on the right side of the detection units SU1 and SU2, and the transfer direction D may be the y-axis negative direction. In addition, it is assumed that the inspection target object OB contains the metal foreign substance MT.

(2) Obtaining Signals P1 and P2 from Detection Units SU1 and SU2 (Magnetic Sensors SE1 and SE2) (Step S12)

When the metal foreign substance MT in the inspection target object OB passes between the magnets MG1 and MG2 that face each other, disturbance of a magnetic field, that is, a change in the magnetic field occurs. As a result of the change in the magnetic field, the signals P1 and P2 are generated by the magnetic sensors SE1 and SE2 and are inputted to the control section 10 (step S12).

(3) Making Determination Based on Strength of Signals P1 and P2 (Steps S13 to S15)

The processor PR determines whether or not the inspection target object OB contains the metal foreign substance MT (whether or not metal is detected), on the basis of the strength of the signals P1 and P2 (detection step: steps S13 to S15). Specifically, whether or not the absolute values of the peak values (peak voltages) of the signals P1 and P2, which have been amplified by the amplifiers AMP1 and AMP2, are greater than the thresholds Th1 and Th2 is determined. For example, in a case where the absolute value (first absolute value) of the peak voltage of the signal P1 is greater than the threshold Th1 (first threshold) (condition 1 is satisfied) or the absolute value (second absolute value) of the peak voltage of the signal P2 is greater than the threshold Th2 (second threshold) (condition 2 is satisfied), the processor PR determines that the inspection target object OB contains the metal foreign substance MT (metal is detected) (step S14). On the other hand, in a case where the absolute value of the peak voltage of the signal P1 is not greater than the threshold Th1 (condition 1 is not satisfied) and the absolute value of the peak voltage of the signal P2 is not greater than the threshold Th2 (condition 2 is not satisfied), the processor PR determines that the inspection target object OB does not contain the metal foreign substance MT (metal is undetected) (Step S15).

Here, it is determined that metal is detected, in a case where one or both of the conditions 1 and 2 is/are satisfied. However, a case where one of the conditions 1 and 2 is satisfied and a case where both of the conditions 1 and 2 are satisfied may be divided into separate cases. For example, in a case where both of the conditions 1 and 2 are satisfied, it may be determined that detection strength is strong. On the other hand, in a case where one of the conditions 1 and 2 is satisfied, it may be determined that the detection strength is weak. In addition, the conditions 1 and 2 may be each considered to mean whether or not metal is detected on a corresponding one of the upper side and the lower side of the inspection target object OB.

In the above description, the strength of the signals P1 and P2 are determined on the basis of the peak values of the signals P1 and P2, respectively. Alternatively, the signals P1 and P2 may be compared with the reference signals SP1 and SP2, respectively. Further, respective summation values I1 and I2 obtained by summation of the signals P1 and summation of the signals P2 may be compared with the reference values.

(4) Making Determination Based on Phases of Signals P1 and P2 (Steps S16 to S18)

In a case where it is determined in step S13 (detection step) that the inspection target object OB contains the metal foreign substance MT (metal), whether or not the determination result in step S13 is correct or erroneous is confirmed on the basis of the phase difference between the signals P1 and P2 (confirmation step: steps S16 to S18). Here, in a case where the determination in step S13 is Yes (when metal is detected), it is determined whether or not the signals P1 and P2 are substantially in opposite phase with each other (step S16). In a case where a determination result in step S16 is Yes, the determination regarding detection of metal is determined to be correct (normal detection) (step S17). Conversely, in a case where the determination result in step S16 is No, the determination regarding detection of metal is determined to be erroneous (erroneous detection) (step S18).

Figure 4:
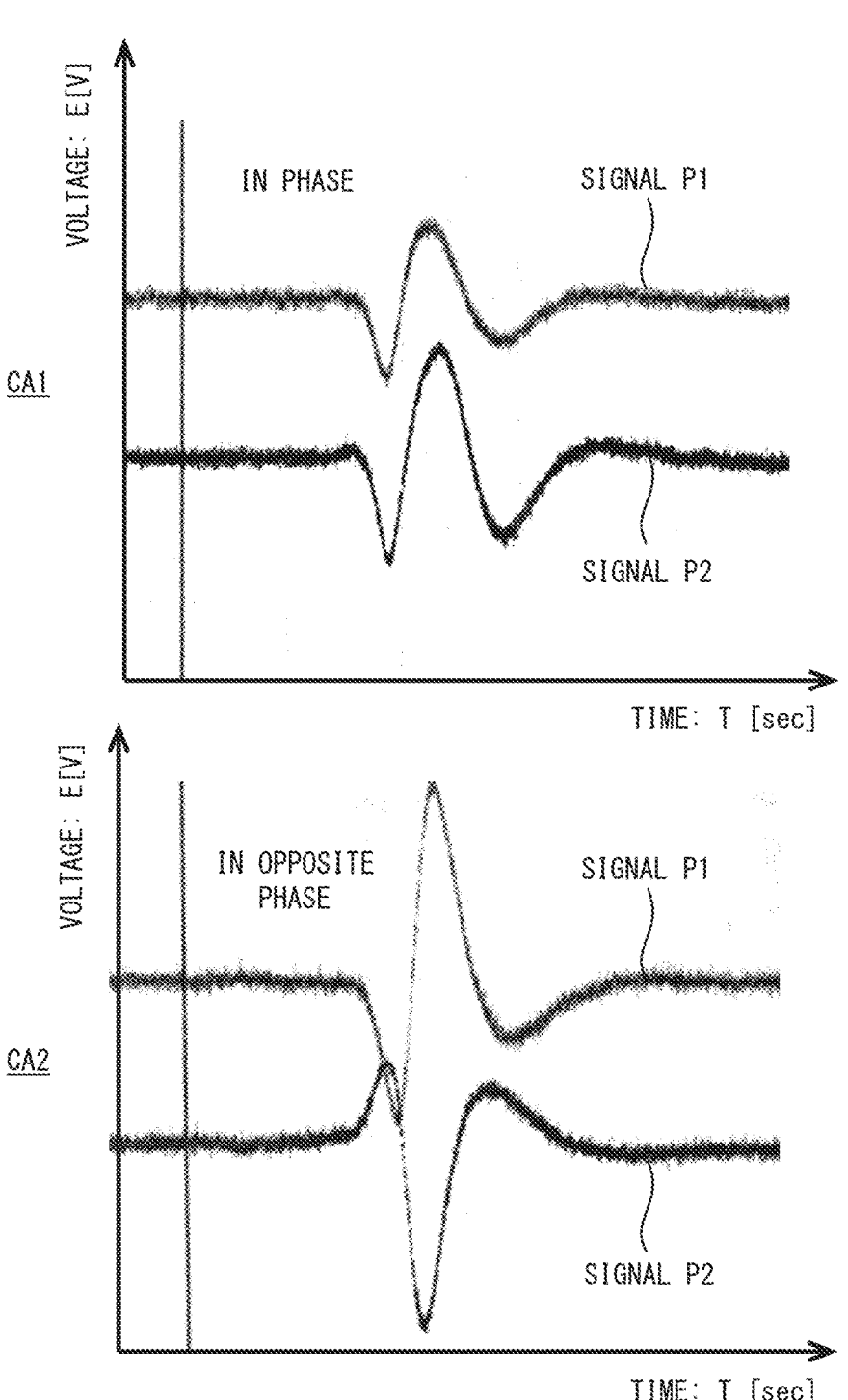
FIG. 4 is a graph showing examples of signals P1 and P2.

FIG. 4 shows examples (CA1 and CA2) in one of which the signals P1 and P2 are in phase with each other and in the other of which the signals P1 and P2 are in opposite phase with each other. When the metal foreign substance MT passes inside the in-gate space GA, the signals P1 and P2 tend to be substantially in opposite phase with each other (CA2). On the other hand, when the metal foreign substance MT passes outside the in-gate space GA, the signals P1 and P2 tend to be close to an in-phase state (CA1). Utilization of this tendency makes it possible to determine whether or not the result of detection of metal is appropriate. The following description will discuss a reason why such a tendency occurs.

As described above, the same poles (N or S) of the magnets MG1 and MG2 face each other. Here, for easy understanding, it is assumed that N poles of the magnets MG1 and MG2 face each other. At this time, a magnetic field B1 from the magnet MG1 and a magnetic field B2 from the magnet MG2 repel each other and become an unstable state in which a boundary is formed between the magnets MG1 and MG2. Such instability increases a change in the magnetic fields B1 and B2 due to the metal foreign substance MT and leads to improvement in accuracy of detection of the metal foreign substance MT.

Here, the metal foreign substance MT within the in-gate space GA causes the boundary between the magnetic fields B1 and B2 to shift up or down. For example, in a case where the metal foreign substance MT passes on the magnet MG1 side, the metal foreign substance MT tends to strengthen the magnetic field B1 and to push the boundary between the magnetic fields B1 and B2 downward. Conversely, in a case where the metal foreign substance MT passes on the magnet MG2 side, the metal foreign substance MT tends to strengthen the magnetic field B2 and to push the boundary between the magnetic fields B1 and B2 upward. In either case, passage of the metal foreign substance MT causes the boundary between the magnetic fields B1 and B2 to shift up or down. As a result of this up or down shift of the boundary, the magnetic sensor SE1 has a directionality opposite to that of the magnetic sensor SE2. For example, while the magnetic field received by the magnetic sensor SE1 increases, the magnetic field received by the magnetic sensor SE2 decreases. As a result, the signals P1 and P2 of the magnetic sensors SE1 and SE2, which result from the metal foreign substance MT in the in-gate space GA, tend to be in a reversed phase (in opposite phase).

This tendency becomes stronger, when the magnetic sensors SE1 and SE2 are arranged so as to face each other in addition to an arrangement in which the same poles of the magnets MG1 and MG2 face each other. This is because, between the magnetic sensors SE1 and SE2, the boundary between the magnetic fields B1 and B2 is shifted up or down.

On the other hand, the metal foreign substance MT outside the in-gate space GA does not contribute to such an upward or downward shift of the boundary between the magnetic fields B1 and B2. As a result, the signals P1 and P2 of the magnetic sensors SE1 and SE2, which are resulting from the metal foreign substance MT outside the in-gate space GA, tend to be in phase with each other.

Here, the following will discuss a relationship between the changes in magnetic field which are received by the magnetic sensors SE1 and SE2 and the phases of the signals P1 and P2. Here, a state in which the signals P1 and P2 are in phase with each other means that respective changes in magnetic field which are received by the magnetic sensors SE1 and SE2 are changes in one direction. For example, the state means that both of the changes are an increasing change or a decreasing change. On the other hand, a state in which the signals P1 and P2 are in opposite phase with each other means that the respective changes in magnetic field which are received by the magnetic sensors SE1 and SE2 are changes in opposite directions. For example, the state means that while one of the changes is an increasing change, the other one of the changes is a decreasing change. The positive or negative of each of the voltages V1 and V2 of the signals P1 and P2 is reversed depending on which one of a pair of terminals from a corresponding one of the magnetic sensors SE1 and SE2 is used as a reference. For example, depending on whether a terminal at an upper end or a terminal at a lower end of a coil of the magnetic sensor SE1 is used as a reference, the positive or negative, i.e., an apparent phase of the signal P1 is reversed. However, with regard to the phases of the signals P1 and P2 in the present embodiment, it is assumed that reversal of an in-phase state or an opposite-phase state (reversal of phase) that is caused by a difference in a wiring connection relationship is not considered.

(5) Displaying Determination Result and Stopping Transfer (Steps S19 and S20)

The processor displays the determination result on the display section 11 (step S19) and stops transfer of the inspection target object OB (step S20). The order of displaying and stopping the transfer may be reversed.

The determination result can be displayed together with whether or not metal is detected and whether or not the detection is correct or erroneous. The display can be, for example, "Metal is undetected", "Metal is detected (normal detection)", or "Metal is detected (erroneous detection). Note, however, that whether or not metal is detected and whether or not the detection is correct or erroneous may be separately displayed. Further, the determination result may be outputted from the input/output section 12.

As described above, the inspection target object OB can be transferred so as to pass between the detection units SU1 and SU2, and whether or not the metal is detected and whether or not the detection is correct or erroneous can be determined on the basis of the strength and phases of the signals P1 and P2 from the detection units SU1 and SU2. Since the phases of the signals P1 and P2 are used, addition of a sensor for detecting external magnetic noise is unnecessary.

The following description will discuss a process for determining the determination reference SD. FIG. 5 is a flowchart showing an example of the process for obtaining the reference signals.

As an inspection reference object, an inspection target object OB that contains no metal foreign substance MT is placed on the belt BE of the transfer section TR and transferred so as to pass between the detection units SU1 and SU2 (step S21). Thereafter, the signals P1 and P2 from the detection units SU1 and SU2 (magnetic sensors SE1 and SE2) are obtained and stored in the memory MM as the determination reference SD (step S22), and then, transfer of the inspection target object OB is stopped (step S23).

In a case where the thresholds Th1 and Th2 are used as the determination reference SD, for example, the absolute values of the peak values of the signals P1 and P2 or values obtained by adding some positive value to these absolute values can be set as the thresholds Th1 and Th2. In addition, in a case where the reference signals SP1 and SP2 are each used as the determination reference SD, for example, the signals P1 and P2 themselves obtained or signals obtained by adding some value (steady signal) to the signals P1 and P2 can be used as the reference signals SP1 and SP2.

Figure 7:
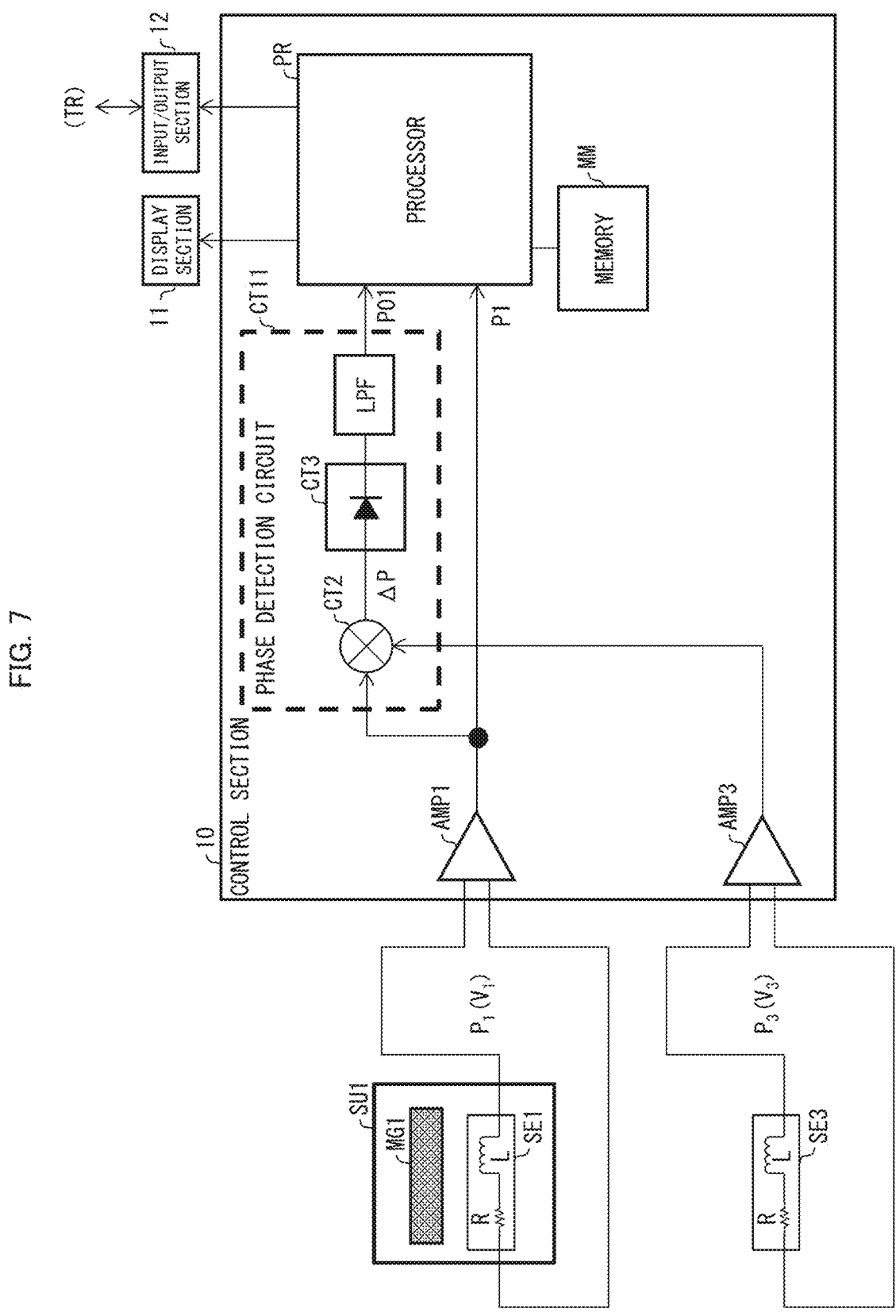
FIG. 7 is a diagram illustrating a control section of the metal detecting device in accordance with Embodiment 2 of the present invention.

The following description will discuss another embodiment of the present invention. FIG. 6 is a view illustrating a metal detecting device 1 in accordance with Embodiment 2 of the present invention. FIG. 7 is a diagram illustrating a control section 10 of the metal detecting device 1 in accordance with Embodiment 2 of the present invention. For convenience of description, members having functions identical to those described in Embodiment 1 above are assigned identical reference signs, and their descriptions are not repeated here.

Here, magnetic sensors SE3 and SE4 are added outside the detection units SU1 and SU2 so as to be aligned with the detection units SU1 and SU2. As illustrated in FIG. 7, a signal P1 from the magnetic sensor SE1 in the detection unit SU1 and a signal P3 from the magnetic sensor SE3 provided outside are subjected to phase detection by a phase detection circuit CT11 in order to determine phases. Then, the result of the phase detection is outputted as a signal P01. Although not shown, a signal P2 from the magnetic sensor SE2 in the detection unit SU2 and a signal P4 from the magnetic sensor SE4 provided outside are subjected to phase detection by a phase detection circuit CT12. Then, the result of the phase detection is outputted as a signal P02. Here, unlike Embodiment 1, the phase detection is not carried out between the signals P1 and P2.

The magnetic sensor SE3 here is arranged so as to be aligned with the magnet MG1 (first magnet) via the magnetic sensor SE1 (first magnetic sensor). Then, the magnetic sensor SE3 functions as a second magnetic sensor that outputs a signal P3 (in this case, a second signal) which corresponds to a change in magnetic field. Further, the magnetic sensor SE2 is arranged so as to be aligned with the magnet MG2 (second magnet) and so as to face the magnetic sensor SE1 via a path of an inspection target object OB. Then, the magnetic sensor SE2 functions as a third magnetic sensor that outputs a signal P2 (here, a third signal) which corresponds to a change in magnetic field. The magnetic sensor SE4 is arranged so as to be aligned with the magnet MG2 (second magnet) via the magnetic sensor SE2 (third magnetic sensor). Then, the magnetic sensor SE4 functions as a fourth magnetic sensor that outputs a signal P4 (fourth signal) which corresponds to a change in magnetic field. In addition, respective center axes of coils of the magnetic sensors SE1 and SE3 and respective center axes of coils of SE2 and SE4 can be arranged to be substantially parallel to a direction (for example, the z-axis direction) in which opposed magnetic poles of each of the magnet MG1 and the magnet MG2 are arranged.

Figure 8:
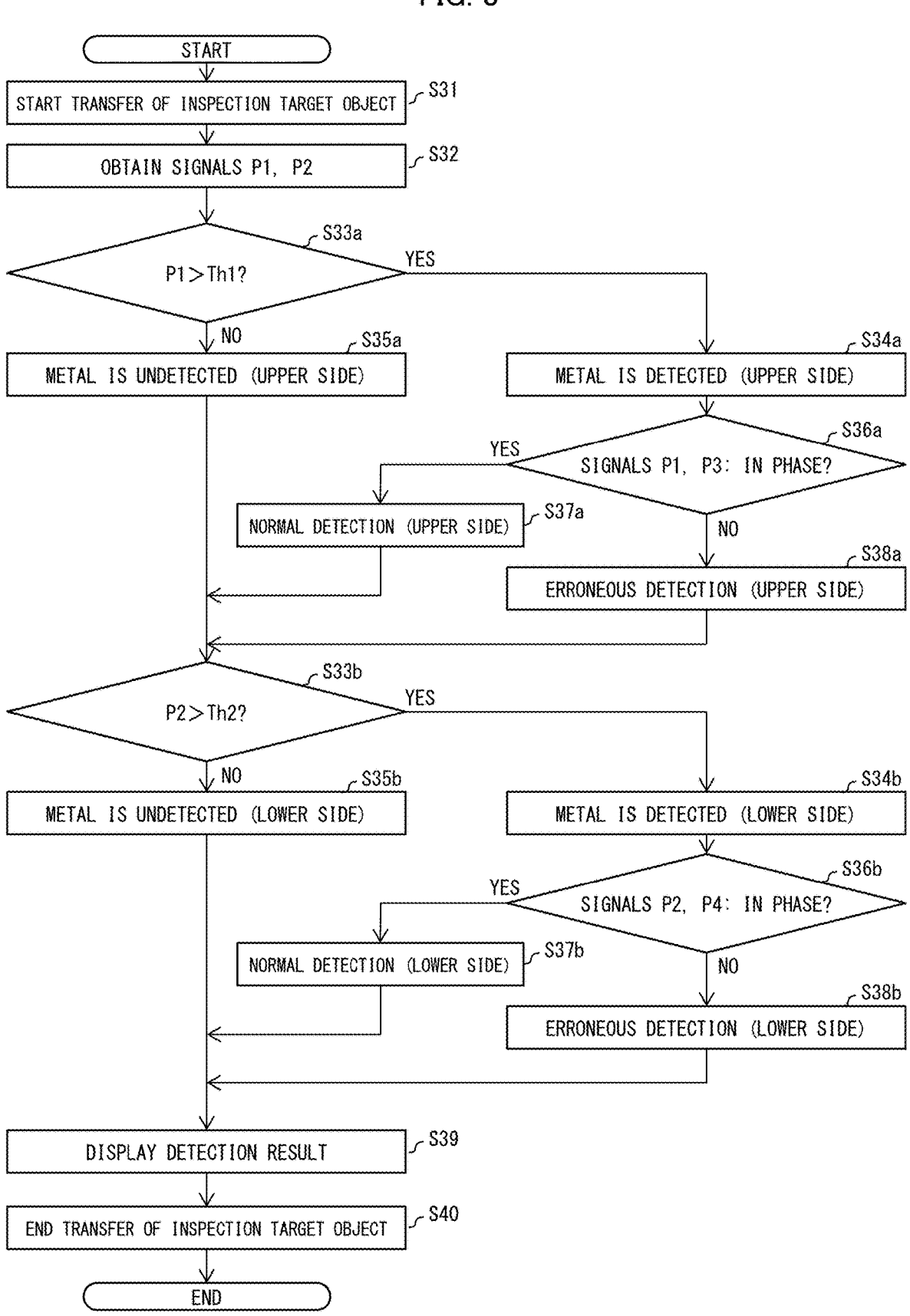
FIG. 8 is a flowchart showing an example of a metal detecting method in accordance with Embodiment 2.

The following will discuss a process for detecting a metal foreign substance MT in Embodiment 2. FIG. 8 is a flowchart showing an example of the process for detecting metal (metal foreign substance MT).

(1) Placing and Starting Transfer of Inspection Target Object OB (Step S31)

Since step S31 is the same as step S11 of Embodiment 1, a description thereof will be omitted.

(2) Obtaining Signals P1 to P4 from Magnetic Sensors SE1 to SE4 (Step S32)

In this step, when the metal foreign substance MT in the inspection target object OB passes between the magnets MG1 and MG2 that face each other, the signal P1 to P4 from the magnetic sensors SE1 to SE4 are obtained (step S32).

(3) Making Determination Based on Strength of Signals P1 and P2 (Steps S33a to S35a and S33b to S35b)

A processor PR determines whether or not the inspection target object OB contains the metal foreign substance MT (whether or not metal is detected), on the basis of the strength of the signals P1 and P2 (first signal and third signal) (detection step: steps S33a to S35a and S33b to S35b). Here, whether or not metal is detected and whether or not such determination is correct or erroneous are determined separately for each of the signals P1 and P2. This can be considered to mean that detection of metal and confirmation of the detection are carried out for each of an upper side and a lower side of the inspection target object OB.

Note, however, that if the determination is made such that (i) in a case where the signal P1 is greater than the threshold Th1 and/or the signal P2 is greater than the threshold Th2, it is determined that metal is detected and (ii) in a case where the signal P1 is not greater than the threshold Th1 and the signal P2 is not greater than the threshold Th2, it is determined that no metal is detected, such an arrangement is identical to that of Embodiment 1.

That is, in a case where an absolute value (first absolute value) of a peak voltage of the signal P1 (first signal) is greater than the threshold Th1 (first threshold) or an absolute value (third absolute value) of a peak voltage of the signal P2 (third signal) is greater than the threshold Th2 (second threshold), it is determined that the inspection target object OB contains metal. In addition, in a case where the first absolute value is not greater than the threshold Th1 (first threshold) and the third absolute value is not greater than the threshold Th2 (second threshold), it is determined that the inspection target object OB does not contain metal.

(4) Making Determination Based on Phases of Signals P1 and P3 and Phases of Signals P2 and P4 (Steps S36a to S38a and S36b to S38b)

Here, unlike Embodiment 1, whether or not the determination of detection of metal is correct or erroneous is determined on the basis of phases of the signals P1 and P3 and phases of the signals P2 and P4. That is, in a case where the determination in step S33a is Yes (in a case where metal is detected), it is determined whether or not the signals P1 and P3 are substantially in phase with each other (step S36a). In a case where the determination result in step S36a is No, the determination of detection of metal is determined to be erroneous (erroneous detection) (step S38a). Conversely, in a case where the determination result in step S36a is Yes, the determination of detection of metal is determined to be correct (normal detection) (step S37a). Similarly, in a case where the determination in step S33b is Yes, it is determined whether or not the signals P2 and P4 are substantially in phase with each other (steps S36b to 38b).

Here, in the case of a determination reference of Embodiment 2, unlike in the case of Embodiment 1, the detection of metal is determined to be a normal detection when the two signals are substantially in phase with each other whereas the detection of metal is determined to be an erroneous detection when the two signals are not substantially in phase with each other. The following description will discuss a reason for this.

The magnetic sensors SE1 and SE3 are arranged so as to be aligned with the magnet MG1, which generates a magnetic field B1, on one side (upper side) of an in-gate space GA. Therefore, it is considered that a change in the magnetic field B1 which occurs when the metal foreign substance MT passes through the in-gate space GA tends to be similar between the magnetic sensors SE1 and SE3, that is, the magnetic field B1 to the magnetic sensor SE1 and the magnetic field B1 to the magnetic sensor SE3 tend to be in phase with each other. Therefore, the signals P1 and P3 corresponding to the metal foreign substance MT in the in-gate space GA is likely to be in phase with each other.

In contrast, in a case where the metal foreign substance MT passes outside the in-gate space GA, it is considered that due to a difference between the positions of the magnetic sensors SE1 and SE3, the change in the magnetic field B1 differs between the magnetic sensors SE1 and SE3 and a phase difference between the magnetic field B1 to the magnetic sensor SE1 and the magnetic field B1 to the magnetic sensor SE3 tends to be larger. As a result, the signals P1 and P3 corresponding to the metal foreign substance MT outside the in-gate space GA tend to be in a phase close to an opposite phase.

Here, as in Embodiment 1, a state in which the signals P1 and P3 are in phase with each other means that respective changes in magnetic field received by the magnetic sensors SE1 and SE3 are changes in one direction. For example, the state means that both of the changes are an increasing change or a decreasing change. On the other hand, a state in which the signals P1 and P3 are in opposite phase with each other means that the respective changes in magnetic field received by the magnetic sensors SE1 and SE3 are changes in opposite directions. For example, the state means that while one of the changes is an increasing change, the other one of the changes is a decreasing change. In other words, with regard to the phases of the signals P1 and P3, it is assumed that reversal in phase that is caused by a difference in a wiring connection relationship is not considered. In this regard, the same applies to the phases of the signals P2 and P4.

(5) Displaying Determination Result and Stopping Transfer (Steps S39 and S40)

The processor displays the determination result on the display section 11 (step S39) and stops transfer of the inspection target object OB (step S40). The order of displaying and stopping the transfer may be reversed.

The determination result can be displayed, for example, for each of the upper side and the lower side of the inspection target object OB in a manner corresponding to the magnetic sensor SE1 or SE2, together with whether or not metal is detected and whether or not the detection is correct or erroneous. For example, regarding the upper side of the inspection target object OB, the following is displayed: "Metal is undetected (upper side)", "Metal is detected (upper side, normal detection)" or "Metal is detected (upper side, erroneous detection)". Similar display is performed for the lower side It is possible to display results of the upper side and the lower side of the target object OB together. For example, in a case where no metal is detected on neither the upper side nor the lower side, "Metal is undetected" is displayed. Conversely, in a case where metal is detected on the upper side or the lower side, "Metal is detected (normal detection)" or "Metal is detected (erroneous detection)" is displayed. For example, in a case where the determination result in neither step S36a nor step S36b is "erroneous detection", "Metal is detected (normal detection)" is displayed. On the other hand, in a case where the determination result in step S36a or step S36b is "erroneous detection", "Metal is detected (erroneous detection)" is displayed.

Note, however, that whether or not metal is detected and whether or not the detection is correct or erroneous may be separately displayed. Further, the determination result may be outputted from the input/output section 12.

As described above, the metal detecting device 1 according to Embodiment 2 has (1) the magnetic sensors SE1 and SE2 that face each other and that output signals P1 and P2, respectively and (2) the magnetic sensors SE3 and SE4 that are arranged so as to be aligned with magnetic sensors SE1 and SE2, respectively, and that output signals P3 and P4, respectively. Then, on the basis of the strength of the signals P1 and P2, the phases of the signals P1 and P3, and the phases of the signals P2 and P4, whether or not metal is detected and whether or not the detection is correct or erroneous are determined.

Embodiments 1 and 2 of the present invention can be combined. That is, a variation, like Embodiment 2, has the configuration illustrated in FIG. 6. Further, in the variation, as in Embodiments 1 and 2, whether or not metal is detected is determined on the basis of the signals P1 and P2 from the magnetic sensors SE1 and SE2.

On the other hand, whether or not the detection is correct or erroneous is determined on the basis of the phases of the signals P1 and P2, the phases of the signals P1 and P3, and the phases of the signals P2 and P4. For example, in any of (1) a case where the signals P1 and P2 are in phase with each other, (2) a case where the signals P1 and P3 are not in phase with each other and (3) a case where the signals P2 and P4 are not in phase with each other, the detection is determined to be "erroneous detection", and in the other cases, the detection is determined to be "normal detection". In other words, the detection is determined to be "erroneous detection" in a case where any one of the above conditions (1) to (3) is satisfied. Alternatively, for example, it is also possible to determine that the detection is "erroneous detection" in a case where all of the conditions (1) to (3) are satisfied. In view of more reliable detection of the metal foreign substance MT, it is preferable that a range of "normal detection" be not extended to a too broad range.

The present invention is not limited to the embodiments, but can be altered by a skilled person in the art within the scope of the claims. The present invention also encompasses, in its technical scope, any embodiment derived by combining technical means disclosed in differing embodiments.

The invention claimed is:

1. A metal detecting device comprising:

a first magnet that generates a magnetic field that is static;

a second magnet that is arranged so as to face the first magnet and that generates another magnetic field that is static;

a transfer section that transfers an inspection target object along a path that passes between the first magnet and the second magnet;

a first magnetic sensor that is arranged so as to be aligned with the first magnet and that outputs a first signal which corresponds to a change in magnetic field;

a second magnetic sensor that is arranged so as to be aligned with the second magnet or so as to be aligned with the first magnet via the first magnetic sensor and that outputs a second signal which corresponds to a change in magnetic field; and one or more processors, the processors carrying out a determination step of determining whether or not the inspection target object contains metal based on a magnitude of strength of the first signal and whether or not a phase of the first signal is opposite to a phase of the second signal.

2. The metal detecting device according to claim 1, wherein the determination step includes:

a detection step in which whether or not the inspection target object contains metal is determined based on the magnitude of the strength of the first signal; and a confirmation step in which when the inspection target object is determined to contain metal in the detection step, whether or not a result of determination in the detection step is correct or erroneous is confirmed based on whether or not the phase of the first signal is opposite to the phase of the second signal.

3. The metal detecting device according to claim 2, wherein:

the second magnetic sensor is arranged so as to be aligned with the second magnet and so as to face the first magnetic sensor via the path; and the detection step includes the step of determining whether or not the inspection target object contains metal, based on the magnitude of the strength of the first signal and a magnitude of strength of the second signal.

4. The metal detecting device according to claim 3, wherein the detection step includes steps of:

determining that the inspection target object contains metal, when (a) a first absolute value of a peak of the first signal is greater than a first threshold or (b) a second absolute value of a peak of the second signal is greater than a second threshold; and determining that the inspection target object does not contain metal, when (c) the first absolute value of the peak of the first signal is not greater than the first threshold and (d) the second absolute value of the peak of the second signal is not greater than the second threshold.

5. The metal detecting device according to claim 3, wherein the confirmation step includes steps of:

determining that the result of the determination in the detection step is correct, when the first signal is in opposite phase with the second signal; and determining that the result of the determination in the detection step is erroneous, when the first signal is not in opposite phase with the second signal.

6. The metal detecting device according to claim 2, wherein:

the second magnetic sensor is arranged so as to be aligned with the first magnet via the first magnetic sensor; and the detection step includes the step of determining whether or not the inspection target object contains metal, based on the magnitude of the strength of the first signal.

7. The metal detecting device according to claim 6, wherein the detection step includes steps of:

determining that the inspection target object contains metal, when a first absolute value of a peak of the first signal is greater than a first threshold; and determining that the inspection target object does not contain metal, when the first absolute value of the peak of the first signal is not greater than the first threshold.

8. The metal detecting device according to claim 6, wherein the confirmation step includes steps of:

determining that the result of the determination in the detection step is correct, when the first signal and the second signal are in phase with each other; and determining that the result of the determination in the detection step is erroneous, when the first signal is not in phase with the second signal.

9. The metal detecting device according to claim 6, further comprising:

a third magnetic sensor that is arranged so as to be aligned with the second magnet and so as to face the first magnetic sensor via the path and that generates a third signal which corresponds to a change in magnetic field; and a fourth magnetic sensor that is arranged so as to be aligned with the second magnet via the third magnetic sensor and that outputs a fourth signal which corresponds to a change in magnetic field, the detection step including the step of determining whether or not the inspection target object contains metal, based on the magnitude of the strength of the first signal and a magnitude of strength of the third signal, the confirmation step including the step of confirming whether or not the result of the determination is correct or erroneous, based on whether or not the phase of the first signal is different from the phase of the second signal and whether or not a phase of the third signal is different from a phase of the fourth signal.

10. The metal detecting device according to claim 1, wherein:

the first magnet has a first pole that is South pole or North pole;

the second magnet has a second pole that faces the first pole and that has a same polarity as the first pole; and the inspection target object passes between the first pole and the second pole.

11. The metal detecting device according to claim 1, further comprising a phase detection circuit that outputs an absolute value of a differential detection signal indicative of a differential between the first signal and the second signal, the determination step including the step of determining, based on the differential detection signal, a phase difference between the first signal and the second signal.

12. The metal detecting device according to claim 2, further comprising a display section that displays the result of the determination in the detection step and a result of confirmation in the confirmation step.

13. A metal detecting method comprising steps of:

controlling, by a processor, a transfer section that transfers an inspection target object along a path passing between a first magnet, which generates a magnetic field that is static, and a second magnet, which is arranged so as to face the first magnet and which generates another magnetic field that is static, so that the inspection target object passes between the first magnet and the second magnet;

obtaining, by the processor, form a first magnetic sensor, a first signal which corresponds to a change in magnetic field, the first magnetic sensor being arranged so as to be aligned with the first magnet;

obtaining, the processor, from a second magnetic sensor, a second signal which corresponds to a change in magnetic field, the second magnetic sensor being arranged so as to be aligned with the second magnet or so as to be aligned with the first magnet via the first magnetic sensor;

determining, by the processor, whether or not the inspection target object contains metal, based on a magnitude of strength of the first signal and whether or not a phase of the first signal is opposite to a phase of the second signal; and displaying, by the processor, a result of the determining on a display section, and stopping, by the processor, transfer of the inspection target objection after the displaying.

\* \* \* \* \*